Inventor:
Jacob J. Vienneau,
by Harry E. Dunham
His Attorney.

Patented Feb. 29, 1944

2,343,210

UNITED STATES PATENT OFFICE 2,343,210

BUSHING CONSTRUCTION FOR ELECTRICAL APPARATUS

Jacob J. Vienneau, Pittsfield, Mass., assignor to General Electric Company, a corporation of New York Application May 1, 1942, Serial No. 441,309

9 Claims. (Cl. 174—153)

My invention relates to bushing construction for electrical apparatus and to a seal between an insulating material such as a ceramic and metal.

It is an object of my invention to provide an improved bushing construction for electrical apparatus which will maintain its sealing ability for a relatively long life in service.

Another object of my invention is to provide an improved fluid seal construction between an insulating member and a metallic body.

Further objects and advantages of my invention will become apparent from the following description referring to the accompanying drawing, and the features of novelty which characterize my invention will be pointed out with particularity in the claims annexed to and forming a part of this specification.

Figure 1:
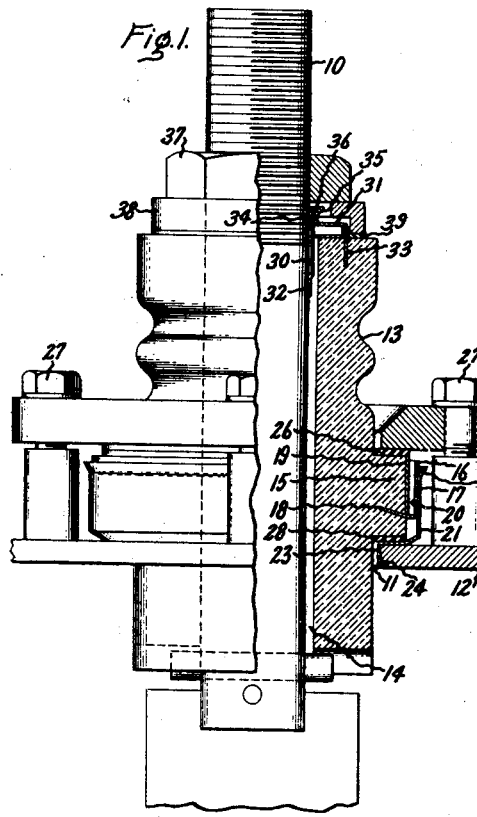
Figure 4:
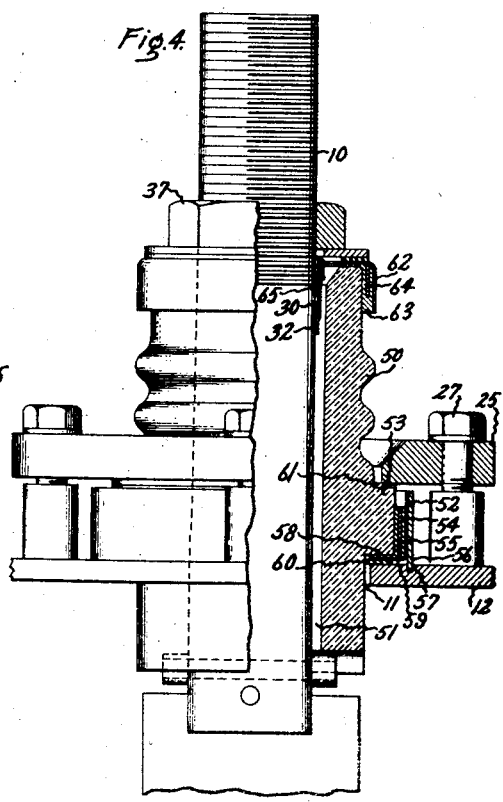
Figure 2:
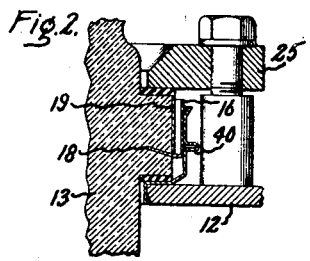
Figure 5:
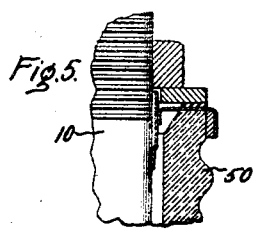
Figure 3:
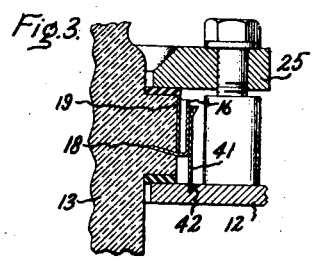
Figure 6:
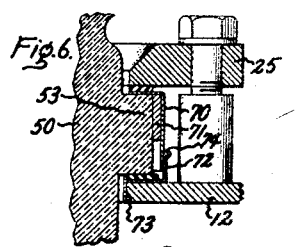

In the drawing Fig. 1 is a side view in partial section of a bushing construction for an electrical apparatus which is provided with an embodiment of my invention; Figs. 2 and 3 are sectional side elevations of portions of bushing constructions illustrating modification of the construction illustrated in Fig. 1; Fig. 4 is a side view in partial section of a modification of the bushing construction illustrated in Fig. 1, and Figs. 5 and 6 illustrate portions of bushing constructions showing modifications of the construction illustrated in Fig. 4.

Referring to Fig. 1 of the drawing it will be seen that I have provided a bushing construction for a suitable electric apparatus, such as a transformer having a conductor or a stud 10 extending through an opening 11 in a casing or cover construction 12, the stud 10 being adapted to be connected to the transformer windings inside the casing 12. Between the stud 10 and the casing 12 is provided an insulating member 13 of any suitable construction and material, such as glass. In the construction illustrated in the drawing the stud 10 extends into or through an opening 14 of the bushing 13 and the bushing in turn has a portion extending into the opening 11 of the cover 12. The bushing also has a shoulder portion 15 having a larger dimension than the diameter of the opening 11 so as to prevent the bushing from dropping through the opening.

In order to provide a substantially fluid tight seal between the bushing 13 and the casing 12 I provide a pair of suitable metallic members 16 and 17 which have portions sealed together and other portions which are sealed to the bushing and to the casing construction. In the arrangement illustrated in Figs. 1, 2, and 3 of the drawing, the metallic member 16 has a portion 18 which is sealed into the shoulder 15 of the bushing. This may be accomplished in any suitable manner such as by casting the portion 18 as a metallic insert during the forming of the glass bushing 13. A metallic ring 19 may be provided around the shoulder 15 so as to allow for suitable flexibility of the member 16 without injuring the seal. The method of embedding the metallic member into the glass forms no part of my invention and an improved arrangement for accomplishing this is described and claimed in a copending application, S. N. 305,666, Hull and Moore, filed November 22, 1939, now issued as Patent 2,299,750, on October 27, 1942, and assigned to the same assignee as this present invention. The metallic member 16 also has a tubular portion 20 which is telescopically arranged with respect to a tubular portion 21 of the metallic member 17 and these telescopically arranged tubular members may be sealed or attached together in any suitable manner, such as by soldering as is indicated by the numeral 22.

It will also be seen that the tubular portions 20 and 21 are spaced from the bushing so as to allow for suitable flexibility between these portions and the bushing and also to minimize the transfer of heat to the bushing while the solder at 22 is being applied to form the seal. The metallic member 17 has an inwardly extending portion 23 which is bent over and sealed in any suitable manner to the surface which surrounds the opening 11, such as by brazing, as shown by the numeral 24.

The bushing may be relatively tightly secured to the casing 12 in any suitable manner such as through a clamping ring 25 which abuts against the upper portion of the shoulder 15 through a gasket 26. The clamping ring 25 may be rigidly attached to the cover 12 by removable bolts 27. A gasket 28 may also be provided between the lower portion of the shoulder 15 and the inner surface of the inwardly extending portion 23 of the metallic member 17.

A relatively fluid tight seal between the bushing 13 and the stud 10 may be provided by employing a pair of suitable metallic members 30 and 31 which have portions sealed together, the member 30 being suitably sealed to the stud 10, the member 31 being suitably sealed to the bushing 13. In the arrangement illustrated in the drawing the metallic member 30 has a portion 32 which relatively tightly surrounds the stud 10 and which may be attached thereto in any suitable manner, such as by brazing. The member 31 has a portion 33 which is formed as a metallic insert into the glass bushing 13 during the forming thereof. The metallic members 30 and 31 also have tubular portions 34 and 35, respectively, which are telescopically arranged and sealed together in any suitable manner, such as by soldering, as indicated by the numeral 36. It will be also seen that tubular portions 34 and 35 are spaced from the stud 10 so as to minimize the transfer of heat to the stud during the soldering operation.

The stud 10 may be supported in any suitable manner, such as by threading a nut 37 on to the end thereof which nut is supported by a spacer member 38 which is in turn supported by the upper surface of the bushing 13. A gasket member 39 of suitable material may be placed if desired between the bracket 38 and the top surface of the bushing 13.

The above described bushing construction provides a simple arrangement for obtaining a seal and which construction may be assembled in a convenient manner. Thus, the metallic portions 16 and 31 which are permanently attached to the glass bushing 13 may be cast as inserts therein during the manufacture of the bushing. Also, the metallic member 17 may be attached to the casing 12 before assembly and the metallic member 30 may be attached to the stud before it is inserted into the opening 14 of the bushing 13. The bushing may then be inserted into the opening 11 and the telescopically arranged portions 20 and 21 sealed together by any suitable sealing material which does not require enough heat during the sealing operation to injure the bushing. Furthermore, by forming the member 17 of a relatively thin flexible material not only is a flexible joint obtained but the member will have relatively low heat carrying or absorbing characteristics so the soldering operation at 22 may be accomplished before a large amount of heat is conducted to the casing 12. The soldering operation may then be accomplished at 36 and since the member 30 is of relatively light and flexible material it will have relatively low heat carrying or absorbing characteristics so the soldering operation may be completed before a relatively large amount of heat is conducted to the stud 10. The stud 10 may be then attached to the bushing through the nut 37 and the bushing may be properly attached to the cover by the clamping ring 25 and the cooperating bolts 27.

If a considerable amount of movement may be expected between the cover 12 and the bushing 13 further flexibility may be obtained in the metallic member 17 by making it in the form of a tubular shaped member with a bellowed shape portion 40 as is shown in Fig. 2.

The construction illustrated in Fig. 3 is similar to that illustrated in Fig. 1 except that the metallic member 17 has been substituted with a ring shape member 41 which may be less flexible than the members 17 or 40. A less flexible member may be provided when the cover member 12 is of relatively rigid construction and so only a minimum amount of movement between it and the bushing 13 may be expected. The member 41 may be suitably secured to the casing 12 in any suitable manner such as by brazing in a slot as shown by the numeral 42.

In Fig. 4 I have illustrated a bushing construction which includes the stud member 10 which extends through the opening 11 in the cover 12 of the electric apparatus casing. A bushing 50 of suitable construction and material, such as porcelain may be provided between the metallic members. The bushing member, therefore, has an opening 51 through which the stud 10 extends. A metallic member 52 is provided which surrounds a shoulder 53 of the bushing 50, the member 52 being sealed to the shoulder 53 in any suitable manner, such as by soldering, as is illustrated by the numeral 54. In order to insure a relatively tight solder seal, a shrink ring 55 may be provided inside the ring shaped member 52 and spaced from the bushing shoulder 53. The shrink ring 55 will have suitable contraction or expansion characteristics so that upon the solder cooling that portion of the solder between the ring and the shoulder will be placed under compression. A ring 56 is also provided which is suitably attached to the cover 12 in any suitable manner, such as by welding at 57, and the telescopically arranged tubular portions 52 and 56 may be sealed together in any suitable manner, such as by soldering. A gasket 58 may be provided between an inwardly extending portion 59 of the metallic member 52 and the bushing and another gasket 60 may be provided between the inwardly extending portion 59 and the cover 12. Another gasket 61 may be provided, if desired, between the clamping ring 25 and the upper surface of the bushing shoulder 53. The tubular member 30 is provided around the stud 10 and attached thereto at 32 as has already been described in connection with the construction illustrated in Fig. 1. A metallic member 62 is sealed to the upper portion of the bushing 50 in any suitable manner such as by soldering as indicated by the numeral 63 and a shrink ring 64 is also provided. The metallic member 62 has a tubular portion 65 at the end of an inwardly extending portion which tubular portion is attached or sealed to the cooperating telescopically arranged tubular portion 30 in any suitable manner, such as by soldering.

In assembling the bushing construction it will be seen that the metallic member 52 may be soldered to the bushing 50 when it is in the position as illustrated in Fig. 4, while the metallic member 62 may be soldered to opposite end when the bushing is placed in a position inverted from that illustrated in Fig. 4.

Fig. 5 illustrates a seal construction between the stud 10 and the bushing 50 similar to that illustrated in Fig. 4 except no shrink ring is employed.

In Fig. 6 a flexible seal construction is provided between the bushing 50 and the cover 12 by providing a flexible metallic member 70 which is soldered as shown at 71 to the upper portion of the shoulder 53. The lower portion of the member 70 is telescopically arranged over a metallic member 72 which has a portion brazed to the cover as shown in 73. A lower portion of the member 70 and the metallic member 72 may then be sealed together as indicated by the numeral 74.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In a seal between a casing and a conductor extending through an opening in said casing, an insulating member between said conductor and casing, a pair of relatively flexible metallic members, means for sealing one of said metallic members to said insulating member and the other to said casing, said metallic members having portions telescopically arranged and sealed together at said portions, a second pair of flexible metallic members, and means for sealing one of said second pair of metallic members to said conductor and the other to said insulating member, said second pair of metallic members having portions telescopically arranged and sealed together at said portions.

2. In a seal between a casing and a conductor, an insulating member between said conductor and casing, a pair of metallic members, means for sealing one of said metallic members to said insulating member and the other to said casing, said metallic members having portions telescopically arranged and sealed together at said portions, a second pair of metallic members, and means for sealing one of said second pair of metallic members to said conductor and the other to said insulating member, said second pair of metallic members having portions telescopically arranged and soldered together at said portions.

3. In a seal between a casing and a conductor extending through an opening in said casing, an insulating member between said conductor and casing, a pair of relatively flexible metallic members, means for sealing one of said metallic members to said insulating member and the other to said casing, said metallic members having portions telescopically arranged and soldered together at said portions, a second pair of flexible metallic members, means for sealing one of said second pair of metallic members to said conductor and the other to said insulating member, said second pair of metallic members having portions telescopically arranged and sealed together at said portions, means for relatively rigidly attaching said insulating member to said casing, and means for attaching said conductor to said insulating member.

4. In a seal between a casing and a conductor extending through an opening in said casing, a bushing surrounding said conductor at the opening in said casing, a pair of relatively flexible metallic members, one of said pair of members being sealed to said bushing and the other being brazed to said cover adjacent the opening, said pair of members having tubular portions telescopically arranged and soldered together at said portions to form a substantially fluid tight seal, a second pair of relatively flexible metallic members, one of said second pair being brazed to said conductor and the other being sealed to said bushing, said second pair of members having portions spaced from said conductor and telescopically arranged and soldered together at said portions to form a substantially fluid tight seal, means for relatively rigidly attaching said bushing to said casing about said opening, and means for supporting said conductor through said bushing.

5. In a bushing construction for an electrical apparatus having a casing with an opening, a bushing of ceramic material having a portion extending into said opening, a metallic member having a tubular portion, said metallic member having an inwardly extending flange sealed into said bushing, a second metallic member having a tubular portion concentrically arranged over said tubular portion of said first-mentioned metallic member, said second metallic member having an inwardly extending portion sealed to the surface of said casing bounding said opening, and means for soldering said tubular portions together to form a substantially fluid tight seal, said tubular portions being spaced from said bushing so as to facilitate the making of the soldered joint between said tubular portions.

6. In a bushing construction for an electrical apparatus having a casing with an opening, a bushing of ceramic material having a portion extending into said opening, a metallic member having a tubular portion surrounding said bushing, means including a soldered joint between said tubular portion and said bushing for making a relatively fluid tight seal between said bushing and said metallic member, a metallic ring between said metallic member and said bushing and embedded in said solder for placing a portion of the solder under compression, a second metallic member, and means for brazing said second member to said casing and sealing it to said first-mentioned metallic member.

7. In a bushing construction for an electrical apparatus, a bushing of ceramic material having an opening, a conductor extending through said opening, a metallic member having a tubular portion, means for attaching said metallic member to said conductor, a second metallic member having a tubular portion, means for sealing said second metallic member to said bushing, and means for sealing said tubular portions together, said tubular portions being spaced from said conductor so as to minimize the transfer of heat needed to make said last-mentioned seal to said conductor.

8. A seal between a ceramic and a metallic tank cover including a flexible metallic member having a portion sealed to said ceramic, and a second relatively thin flexible metallic member having a portion brazed to said tank cover, said first and said second metallic members having adjacent portions soldered together, said second member having a relatively low heat carrying characteristic so as to minimize the flow of heat to said tank cover while said members are being sealed together.

9. In a bushing construction for an electrical apparatus having a casing with an opening, a bushing of ceramic material adjacent the opening, a metallic member having a tubular portion surrounding said bushing, means including a soldered joint between said tubular portion and said bushing for making a relatively fluid tight seal between said bushing and said metallic member, a metallic ring between said metallic member and said bushing and embedded in said solder for placing a portion of the solder under compression; and means for sealing said metallic member to the casing.

JACOB J. VIENNEAU.